G. C. BEIDLER.
CAMERA.
APPLICATION FILED JAN. 22, 1917.
1,371,722.
Patented Mar. 15, 1921.
2 SHEETS—SHEET 2.
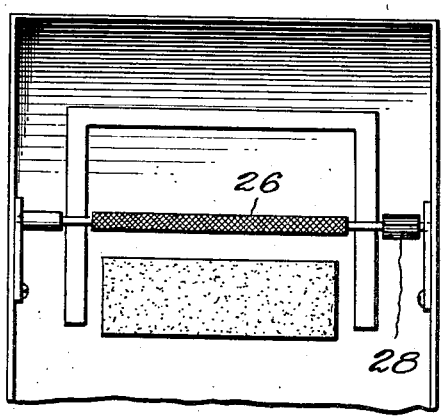
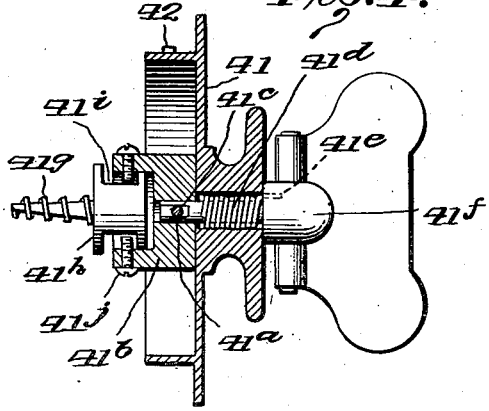
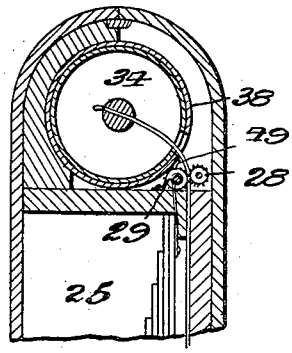
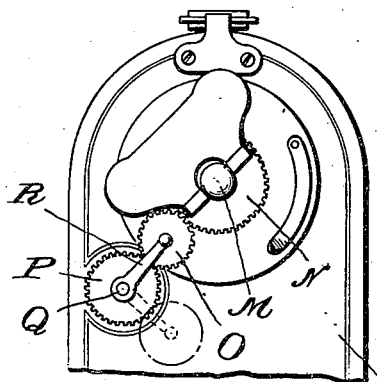
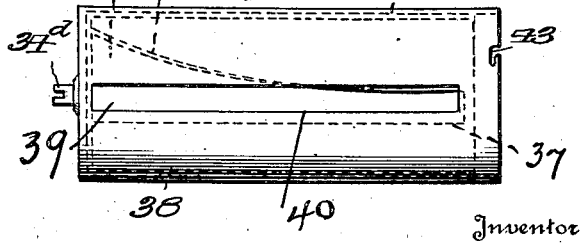
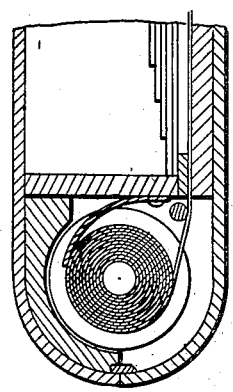
Inventor
George C Beidler
By Frank A. Appleman
Attorney

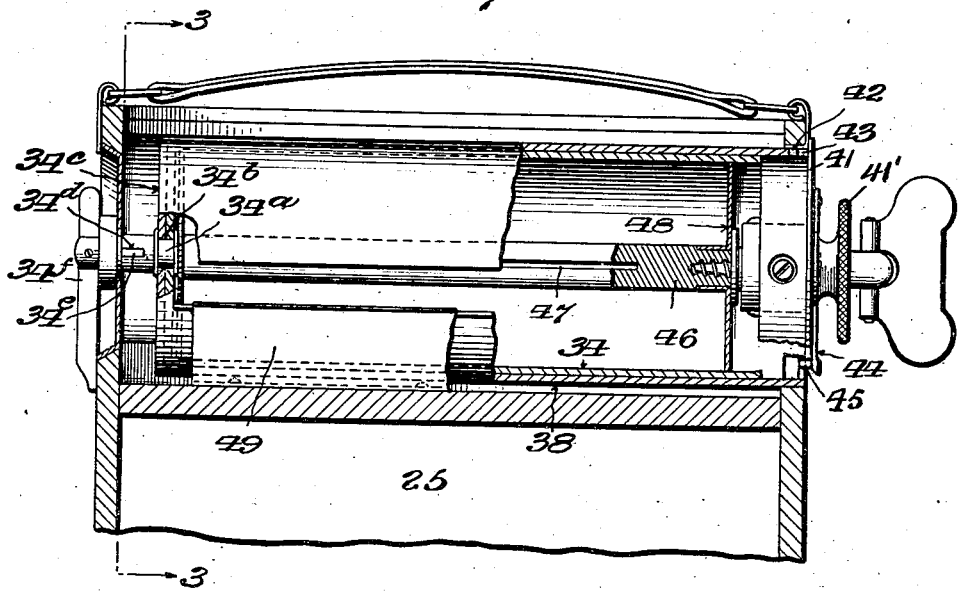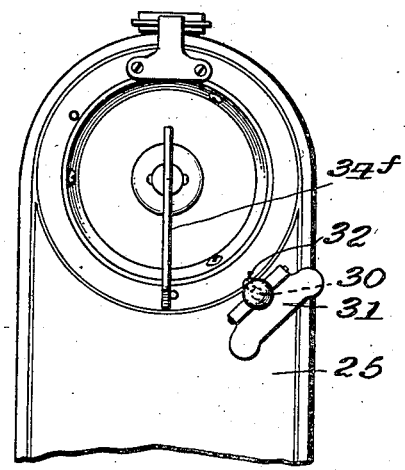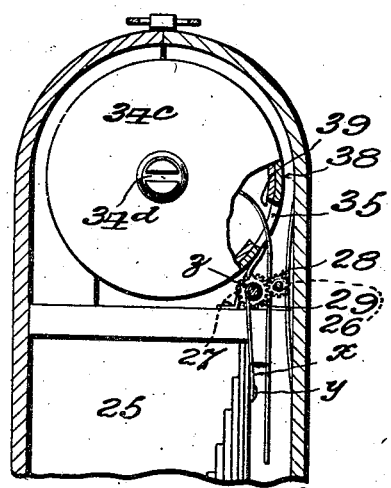

UNITED STATES PATENT OFFICE.

GEORGE C. BEIDLER, OF ROCHESTER, NEW YORK.

CAMERA.

1,371,722.          Specification of Letters Patent.      Patented Mar. 15, 1921.

Application filed January 22, 1917. Serial No. 143,755.

*To all whom it may concern:*

Be it known that I, GEORGE C. BEIDLER, a citizen of the United States of America, and resident of Rochester, in the county of Monroe and State of New York, have invented certain new and useful Improvements in Cameras, of which the following is a specification.

This invention relates to photographing apparatus and to means or instrumentalities by which film is moved from a spool container or magazine into position to be photographically exposed to light and then delivered to a spool container or magazine, where it is wound, coiled or otherwise received and associated with it, means are provided for severing or cutting that portion that has passed through the exposing chamber or instrumentality from that portion which has not been exposed. It is understood, therefore, that one or a plurality of exposed sections or lengths or areas of film may be delivered to the container and that the length of film severed may be arbitrarily determined. For instance, with hand cameras now in common use, an operator may make one or a plurality of exposures and after the film having the exposure thereon has been drawn out of the exposing chamber or means and delivered to the spool container or magazine, the said exposed portion may be severed from the other portion and removed from the camera or casing for the purpose of developing the exposed portion or portions while leaving the unexposed portion or web of film in the camera in an unimpaired state.

Hereafter, in the specification, the term "camera" will be employed and it is to be understood that it is meant thereby any of the so-called "hand" cameras or other photographing apparatus by which sensitized material is exposed to light while being protected from light, other than that admitted by the exposure. The term "spool" will likewise be employed and by that designation, it is understood that there is included any core upon which film is wound or any container or magazine in which the film is wound or which operates or acts as an instrumentality for holding film.

In so-called "hand" cameras or magazine-cameras using flexible film, those now in common use have film which is wound on a spool and the spool is inserted in the camera and an end of the film or an extension thereof is attached or applied to another spool on which the film is wound from the first mentioned spool, the said film in its travel passing to an exposing chamber, a point in the camera where it is exposed to light. In the said cameras now in common use, an inconvenience is experienced by reason of the inability of operators to develop the film containing one or a plurality of exposures prior to exposing the whole length of film, unless, of course, the unexposed portion is wasted. The present invention is designed to obviate this inconvenience and loss and, in practice, very satisfactory results have been obtained by reason of the provision for removing portions of the film as exposures are made without delaying the removal of the film from the camera until the whole length of film has been exposed.

I have illustrated herein certain embodiments of the invention for the purpose of enabling those skilled in the art to practice the same, but my experience has shown that the said invention may be practised in a number of ways with other construction and I, therefore, wish it to be understood that the invention contemplates physical embodiments, other than those which I have illustrated.

A still further object of this invention is to provide means for winding film and permitting the removal of a portion of the winding mechanism with the contained film and the replacement of other substitute spools in operative relation to the spool rotating the winding mechanism, so that spools may be successively used for receiving exposed film, the said spool being removable with any exposed part of a length of film.

With the foregoing and other objects in view, the invention consists in the broad idea to be set forth in the claims during the prosecution of the application, the said claims to be of such scope as to give protection commensurate with the inventive act in view of the state of the art when the invention was produced.

In describing the invention in detail, reference will be had to the accompanying drawings forming part of this specification wherein like characters denote corresponding parts in the several views, and in which—

Figure 1 illustrates a sectional view of a fragment of a camera with the invention applied thereto;

Fig. 2 illustrates an edge view of a fragment of a camera;

Fig. 3 illustrates a vertical sectional view of a camera;

Fig. 4 illustrates an enlarged detail sectional view of a spool engaging and rotating member;

Fig. 5 illustrates a view in elevation of a camera from the edge opposite that shown in Fig. 2;

Fig. 6 illustrates a fragment of the back of a camera with one of the rollers applied thereto;

Fig. 7 illustrates a vertical sectional view of a fragment of the camera showing the supply and take-off rolls;

Fig. 8 illustrates a detail view of a clutch; and

Fig. 9 illustrates a view in elevation of the receptacle and sleeve.

In these drawings 25 denotes what will, for convenience of identification, be termed a "body portion" of the camera. In defining this element, however, the terms "casing," "housing," and many other descriptive terms might be employed, but "body portion" is meant to be comprehensive so that it will include any box, container, housing or shell, capable of carrying or containing the operating mechanism for carrying the invention into practice and the fact that for the purposes of illustration, applicant has depicted folding or pocket cameras which are now in common use, does not mean that the use of the invention is to be, in any way, restricted as to its adaptability to other forms of photographic or reproducing instrumentalities in which sensitized elements are employed to be affected when exposed to light, will be apparent.

With full regard, therefore, to the foregoing definition, provision is made for supplying the said body portion with film drawing or moving means, here shown as consisting of a roller 26 and a roller 27, rotatably carried by the said body portion. The roller 26 has a toothed wheel 28 meshing with a toothed wheel 29 on the roller 27 so that when the roller 27 is rotated, the rollers 26 and 27 are driven so that film may be moved by them for a purpose to be presently and more fully explained.

The roller 27 has a shaft or extension 30 projecting from the body portion and provided at its outer end with a member 31 having for its function the application of power for turning the roller. This element 31 is here shown as receiving the extension 30, and a screw 32 is provided for holding these parts in assembled relation. The roller 27 has a trunnion on one end which is properly journaled with relation to the body portion.

The roller shaft 27 is provided with means for preventing the rollers from being rotated in a direction opposite that in which they should move while feeding film, thus preventing backward movement of the rollers which might cause a disengagement of the film from said rollers. With this in view, a spring clutch is provided consisting of a length of metal having one end $x$ secured to the casing by a fastener $y$, such as a screw, and the said metal is formed into a coil $z$, loosely embracing the shaft, it being observed in practice that when the shaft is rotated in a proper direction, tension is not exerted on the shaft, but when the shaft is rotated in a direction opposite to that in which it should move, the coiled portion of the metal binds against the shaft and prevents its rotation. The coil of the metal should preferably be in the direction on the shaft opposite to that which the shaft moves normally in its operation.

The body portion also carries a receptacle 34 to which film may be delivered and in the present showing, the receptacle is cylindrical and has a longitudinally disposed slot 35 through which the film passes to the interior of the said receptacle. The longitudinally disposed slot has one of its edges 36 shown as curved, and the edge 37 is straight and the edge 36 constitutes, as will presently appear, a cutting edge which coacts with a sleeve 38 having a slot 39 for cutting film which is in the slot. The sleeve 38 has a longitudinally disposed straight slot 39, one edge 40 of which coacts with the edge 36 of the receptacle so that when the receptacle or sleeve is turned, one with relation to the other, there will be a coaction between the edges of these slots to cut the film and as the sleeve telescopes with relation to the receptacle, the slots are closed and light is excluded from the interior of the receptacle and while this relation of parts is effective to exclude light which would affect the sensitized surface of the contained film, the joint between these members is not of such a nature as to exclude liquid. The sleeve 38 has a cap 41 fitting on one end, and the said cap has a bayonet joint connected to the sleeve through the medium of the pins 42 and the slots 43. The cap 41 has a handle 41' and a flat spring 44 anchored to it and said spring has a pin 45, which extends through said cap and enters one of the slots 43 so that movement of the cap with relation to the sleeve is prevented and the bayonet joint cannot be unlocked until the spring is moved to unseat the pin 45.

The receptacle 34 has a trunnion $34^a$ rotatable in an aperture $34^b$ in the head $34^c$ of the sleeve and the said trunnion has a recess $34^d$ which is engaged by a key $34^e$ rotatably mounted in the casing and having an operating boss $34^f$ whereby it is rotated.

A film spool 46, which may have a core of the ordinary wooden type and provided with a slot 47, is mounted in the receptacle, and, in the present embodiment of the invention, the heads or flanges 48 of the spool are of a diameter which will permit the said heads or flanges to fit into the receptacle and be rotated therein, the inner surface of the said receptacle constituting a bearing for the said flanges, so that when the spool is rotated, film may be wound thereon. As the core of the spool has the usual slot 47, the advanced end of the film or the protecting paper which is now commonly employed on the end of the film to protect the same from light, may be inserted in the slot of the spool and the said film can then be wound thereon as is done ordinarily in cameras now in use.

As a means for rotating the spool and for providing a detachable coupling whereby the said spool may be rotated and removed, the cap 41 has an aperture in which a shaft 41$^a$ is rotatable, the inner end of the said shaft having a coupling 41$^b$ mounted on it and secured thereto by the pin 41$^c$. The aperture in the cap, in which the shaft 41$^a$ rotates, is of a diameter great enough to create a clearance between the said shaft and the wall of the aperture to admit a spring 41$^d$ which operates as a clutch to prevent rotation of the shaft in a direction opposite to that in which it should travel when in use. In order to render the said spring operative as a clutch, an end 41$^e$ is anchored in a head 41$^f$ on the said shaft, and the remaining portion of the said spring is coiled around the shaft and is free, so that when power is applied to the shaft in one direction, the said shaft is free to rotate whereas when power is applied to the shaft in an opposite direction, the spring clutch operates to prevent rotation of the shaft.

As a means for communicating the motion of a shaft to the spool 46, a screw 41$^g$ is interposed between the coupling 41$^b$ and the said spool, and the screw is rotated until it is completely threaded in the end of the spool, and the head 41$^h$ of the screw abuts the end of the spool, upon which further rotation of the shaft causes the spool to rotate. When the spool is removed from the receptacle, it may be disengaged from the screw by turning it in a direction which will cause disengagement of the screw from the spool.

I have found in practice that, owing to the inequality or unequal movement of the film, it is desirable that the spool shall have a certain amount of free movement longitudinally of the receptacle and in order to permit such movement, the head of the screw has a recess 41$^i$ in which fastenings, such as screws 41$^j$ are seated, the said screws or fastenings extending through the couplings as shown in Fig. 4, from which illustration, it will be apparent that the head of the screw may slide in the coupling to permit reciprocation of the spool to compensate for inconvenience in the movement of the film.

In Fig. 5, I have shown a means by which motion of the film winding mechanism, that is to say, movement of the shaft by which the spool is turned, may be communicated to the feed rollers so that the feed rollers may be driven in unison therewith to draw film and deliver it to that roller. In this embodiment of the invention, the shaft M which is designed to communicate motion to a spool in accordance with the disclosure heretofore made and which need not be here shown, it being the same as that previously described, has a gear wheel N mounted on it, so that the gear wheel rotates with the shaft and the said gear wheel N is in mesh with an idler O, the said idler in turn being in mesh with the gear wheel P on the shaft Q of the feed roller.

The shaft Q is operative to carry a roller such as the roller 27 heretofore described, and said roller in turn communicates motion to another roller, similar to the roller 26 heretofore described, through the intermeshed toothed wheels 28 and 29.

The idler O is rotatably mounted on an arm R and the said arm is swingingly mounted on the shaft O so that the idler may be drawn into and out of mesh with the wheel N for the purpose of permitting the winding mechanism to operate without communicating motion to the gear wheel P under certain conditions of operation.

As a means for guiding the film to the slot of the receptacle, and as a further means for protecting the sensitized coating of the film so delivered, an apron or shield 49 is attached to a portion of the casing and said shield is of such curvature as to approximately follow the contour of a portion of the outer surface of the casing, and said shield terminates at or slightly above the lower edge of the slot in the said casing so that the curled film fed by the rollers will be guided to the slot of the receptacle and prevented from too quickly curving or falling toward the bottom of the receptacle or container. I have found that the provision of this shield or apron causes the film to more nearly follow the contour of the inner portion of the cylinder or receptacle and that without this apron or shield, the film is prone or apt to curl in a small coil in the bottom of said receptacle.

I claim—

1. In a camera, a body portion, a film holder therein, a film receptacle removable from the body portion adapted to exclude light from the film, a member in the receptacle on which the film is wound, a member threaded in the last mentioned member, means for rotating the second mentioned member, and a yieldable connection between the said rotating means and the said second mentioned member.

2. In a camera, a body portion, a film receptacle therein, a film spool removably mounted in the said receptacle and means for turning said spool comprising a member threaded in the spool, a device for rotating the said threaded member, and yieldable connections between the last mentioned means and the threaded member.

3. In a camera, a body portion, a film holder therein, a film receptacle having means associated with it for excluding light from the film, a spool in the said receptacle operative to move film into the receptacle, means for rotating the said spool comprising a member threaded in the spool, a member for rotating the spool, and yieldable connections between the last mentioned members.

4. In a camera, a body portion, a film holder therein, a film receiver, means associated therewith for cutting film delivered to the receiver, a spool in the receiver adapted to move the film in the receiver, and means for rotating the spool comprising a member threaded in the spool, a member for rotating the spool, and yieldable connections between the last mentioned members.

5. In a camera, a body portion, a film holder therein, a receiver for film, means for cutting film delivered to the receiver, a spool removably mounted in the receiver for moving film therein, and means for rotating the spool comprising a member threaded in the spool, a member for rotating the threaded member, and a coupling between the said members whereby one has sliding movement relative to the other.

6. In a camera, a body portion, a film holder therein, a receiver to which film is delivered, a spool rotatable in the receiver, means for rotating the spool comprising a member threaded in the said spool, a member for rotating the last mentioned member, a sliding connection between the member threaded in the spool and the member for rotating it, and means for pressing the member for rotating the threaded member outwardly.

7. In a camera, a body portion, a film holder therein, a film receiver, a spool rotatable in the said receiver for moving film, a spool rotating member, a coupling between the rotating member and the spool, and means for connecting the said coupling and the said rotating member whereby the said coupling has sliding movement with relation to the said rotating means.

In testimony whereof, I hereunto affix my signature this 13th day of January, 1917.

GEORGE C. BEIDLER.